(12) United States Patent
Sleat

(10) Patent No.: US 11,927,989 B2
(45) Date of Patent: Mar. 12, 2024

(54) COMPUTING DEVICE WITH ROTATABLE KEYBOARD

(71) Applicant: GOOGLE LLC, Mountain View, CA (US)

(72) Inventor: Christopher Wiley Sleat, Annapolis, MD (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/444,688

(22) Filed: Aug. 9, 2021

(65) Prior Publication Data
US 2022/0050511 A1 Feb. 17, 2022

Related U.S. Application Data

(60) Provisional application No. 62/706,344, filed on Aug. 11, 2020.

(51) Int. Cl.
*G06F 1/16* (2006.01)
*H01R 39/34* (2006.01)

(52) U.S. Cl.
CPC .......... *G06F 1/1664* (2013.01); *G06F 1/1671* (2013.01); *G06F 1/1677* (2013.01); *G06F 1/1679* (2013.01); *G06F 1/1637* (2013.01); *G06F 1/1681* (2013.01); *G06F 1/1686* (2013.01); *G06F 1/169* (2013.01); *H01R 39/34* (2013.01)

(58) Field of Classification Search
CPC .... G06F 1/1664; G06F 1/1662; G06F 1/1671; G06F 1/169; G06F 1/1686; G06F 1/1677; G06F 1/1681; E05D 11/0081; H01R 39/34
See application file for complete search history.

(56) References Cited

U.S. PATENT DOCUMENTS

| | | | | |
|---|---|---|---|---|
| 5,237,488 A * | 8/1993 | Moser | ................... | G06F 1/1683 439/31 |
| 6,096,984 A * | 8/2000 | Howell | ............... | G06F 3/03547 178/18.05 |
| 6,429,847 B1 * | 8/2002 | Johnson | .................. | G06F 1/169 345/157 |
| 6,593,914 B1 * | 7/2003 | Nuovo | .................. | G06F 1/1626 345/169 |
| 7,023,421 B2 * | 4/2006 | Wong | ................ | H04M 1/72466 455/566 |
| 7,184,802 B2 * | 2/2007 | Chadha | ................... | H04M 1/23 455/90.3 |
| 7,565,182 B2 * | 7/2009 | Kim | .................... | H04M 1/0247 455/90.3 |
| 7,725,140 B2 * | 5/2010 | Kang | .................. | H04M 1/0247 455/90.3 |

(Continued)

FOREIGN PATENT DOCUMENTS

| | | | | |
|---|---|---|---|---|
| CN | 102158574 A | | 8/2011 | |
| DE | 19909398 A1 * | | 9/2000 | ........... G06F 1/1626 |

(Continued)

*Primary Examiner* — Nidhi Thaker

(74) *Attorney, Agent, or Firm* — Kilpatrick Townsend & Stockton LLP

(57) ABSTRACT

In one general aspect, a computing device includes a hardware processor, a memory, a first housing portion including a touch screen display, and a second housing portion coupled to the first housing portion by a hinge, where the second housing portion includes a rotatable keyboard.

15 Claims, 9 Drawing Sheets

(56) References Cited

U.S. PATENT DOCUMENTS

| | | | |
|---|---|---|---|
| 7,826,205 B2 * | 11/2010 | Smith | G06Q 10/10 |
| | | | 361/679.08 |
| 8,593,414 B2 | 11/2013 | Yen et al. | |
| 8,649,164 B1 * | 2/2014 | Kwok | G06F 1/1666 |
| | | | 361/679.14 |
| 8,934,226 B2 * | 1/2015 | Smith | G06F 1/1613 |
| | | | 361/679.2 |
| 8,952,899 B2 * | 2/2015 | Hotelling | G06F 3/03547 |
| | | | 345/173 |
| 2002/0180704 A1 * | 12/2002 | Rudd | G06F 3/0213 |
| | | | 345/168 |
| 2003/0044000 A1 * | 3/2003 | Kfoury | H04M 1/22 |
| | | | 379/433.04 |
| 2004/0100511 A1 * | 5/2004 | Wong | G06F 1/1647 |
| | | | 715/866 |
| 2004/0142734 A1 * | 7/2004 | Kim | H04M 1/0247 |
| | | | 455/575.1 |
| 2005/0070324 A1 * | 3/2005 | Chadha | H04M 1/0208 |
| | | | 455/575.1 |
| 2005/0125570 A1 * | 6/2005 | Olodort | G06F 1/1681 |
| | | | 710/15 |
| 2005/0272488 A1 * | 12/2005 | Zou | H04M 1/0247 |
| | | | 455/575.4 |
| 2006/0007648 A1 * | 1/2006 | Wang | H04M 1/022 |
| | | | 361/679.3 |
| 2014/0208274 A1 | 7/2014 | Smyth et al. | |
| 2015/0049023 A1 * | 2/2015 | Wu | G06F 3/005 |
| | | | 345/168 |
| 2018/0217709 A1 | 8/2018 | Hotelling | |

FOREIGN PATENT DOCUMENTS

| | | | | |
|---|---|---|---|---|
| KR | 100979108 B1 * | 9/2003 | | |
| WO | WO-2004062116 A2 * | 7/2004 | | G06F 1/1616 |
| WO | WO-2007137421 A1 * | 12/2007 | | B82Y 10/00 |

* cited by examiner

COMPUTING DEVICE WITH ROTATABLE KEYBOARD

CROSS REFERENCE TO RELATED APPLICATIONS

This application claims priority to and the benefit of U.S. Provisional Application No. 62/706,344, filed Aug. 11, 2020, and titled "Computing Device With Rotatable Keyboard," which is hereby incorporated by reference in its entirety.

TECHNICAL FIELD

This description relates to a computing device with a rotatable keyboard.

BACKGROUND

Computing devices are not well established for creative use or non-keyboard text entry or screen manipulation. For example, computing devices do not provide a good lay flat experience that emulates a sketchbook or heavy touch and tap screen interaction that also keeps the keyboard available for more detailed control. Such computing devices may lack the versatility desired for creative users and the flexibility to accommodate both right-handed and left-handed users. Computing devices also may lack assistive controls for users desiring and/or needing non-text entry input methods.

SUMMARY

According to one general aspect, a computing device includes a hardware processor, a memory, a first housing portion including a touch screen display, and a second housing portion coupled to the first housing portion by a hinge, where the second housing portion includes a rotatable keyboard.

Implementations may include one or more of the following features. For example, in some implementations, the rotatable keyboard may include a keyboard and a trackpad. In some implementations, the rotatable keyboard further includes a camera. In some implementations, the rotatable keyboard further includes at least one programmable button. In some implementations, the rotatable keyboard further includes at least three programmable buttons. In some implementations, the rotatable keyboard further includes a trackball.

In some implementations, the rotatable keyboard includes a keyboard, a trackpad, a camera, one or more programmable buttons, and a trackball.

In some implementations, the first housing portion and the second housing portion pivot about the hinge to arrange the computing device such that a bottom surface of the first housing portion and a bottom surface of the second housing portion align on a horizontal plane. In some implementations, the first housing portion and the second housing portion further pivot about the hinge to arrange the computing device such that the bottom surface of the second housing portion aligns on the horizontal plane and the bottom surface of the first housing portion does not align on the horizontal plane.

In some implementations, the second housing portion includes a hub mechanism disposed between the rotatable keyboard and the second housing portion, where the rotatable keyboard rotates about the hub mechanism. In some implementations, the hub mechanism may include a conductive slip ring.

In some implementations, the second housing portion includes a spring loaded bearing disposed between the rotatable keyboard and the second housing portion, where the rotatable keyboard rotates about the spring loaded bearing. In some implementations, the second housing portion may include a locking mechanism to lock the rotatable keyboard in place at predetermined locations within the second housing portion.

In some implementations, the rotatable keyboard is configured to rotate 360 degrees within the second housing portion and the second housing portion remains fixed in place relative to the rotatable keyboard.

In another general aspect, a computing device includes a hardware processor, a memory, a first housing portion including a touch screen display, and a second housing portion coupled to the first housing portion by a hinge, where the second housing portion includes a rotatable keyboard. The rotatable keyboard is configured to rotate 360 degrees within the second housing portion and the second housing portion remains fixed in place relative to the rotatable keyboard. The rotatable keyboard includes, a keyboard, a trackpad, a camera, one or more programmable buttons, and a trackball.

Implementations may include one or more of the following features. For example, the second housing portion may include a hub mechanism disposed between the rotatable keyboard and the second housing portion, where the rotatable keyboard rotates about the hub mechanism. In some implementations, the second housing portion may include a locking mechanism to lock the rotatable keyboard in place at predetermined locations within the second housing portion. In some implementations, the first housing portion and the second housing portion pivot about the hinge to arrange the computing device such that a bottom surface of the first housing portion and a bottom surface of the second housing portion align on a horizontal plane.

In another general aspect, a computing device includes a hardware processor, a memory, a first housing portion including a touch screen display, and a second housing portion coupled to the first housing portion by a hinge, where the second housing portion includes a rotatable keyboard. The rotatable keyboard is configured to rotate 360 degrees within the second housing portion and the second housing portion remains fixed in place relative to the rotatable keyboard and the first housing portion and the second housing portion pivot about the hinge to arrange the computing device such that a bottom surface of the first housing portion and a bottom surface of the second housing portion align on a horizontal plane.

Implementations may include one or more of the following features. For example, the second housing portion includes a locking mechanism to lock the rotatable keyboard in place at predetermined locations within the second housing portion.

The details of one or more implementations are set forth in the accompanying drawings and the description below. Other features will be apparent from the description and drawings, and from the claims.

DETAILED DESCRIPTION

Figure 1:
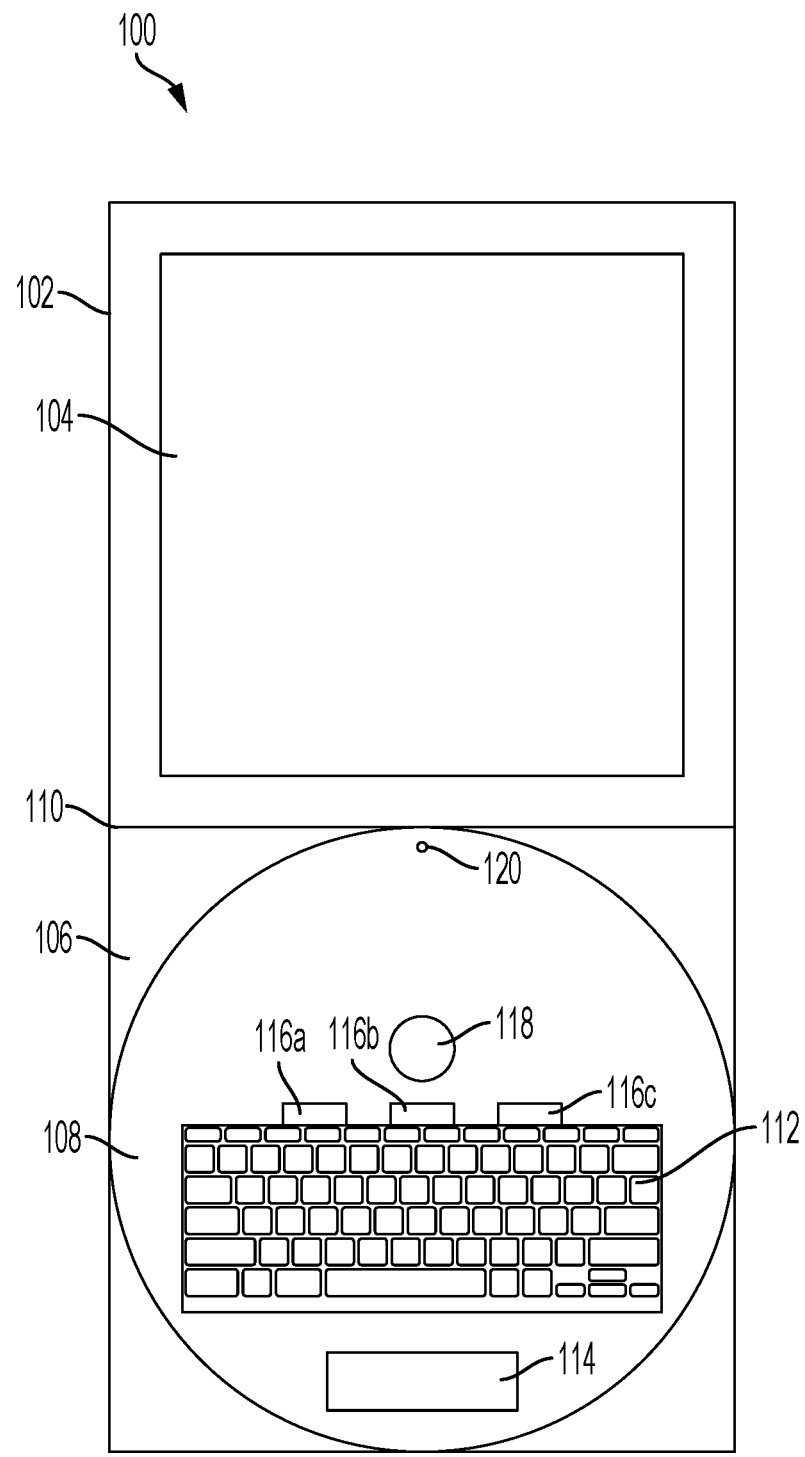
FIG. 1 is an example sketch of a computing device having a rotatable keyboard.

This document describes a computing device having a rotatable keyboard. The computing device includes a housing with a touch screen on one side of the computing device in a first housing portion and the rotatable keyboard on the other side of the computing device in a second housing portion. The rotatable keyboard may be rotated 360 degrees while the computing device housing remains fixed in place.

A hinge mechanism connects the touch screen side and the rotatable keyboard side. The hinge mechanism enables the two sides of the computing device to be adjusted in multiple different positions or configurations. For example, the computing device may be configured so that both the touch screen side and the rotatable keyboard side of the computing device lay flat on a surface with the touch screen side positioned for either a left hand dominant user or a right hand dominant user. The rotatable keyboard may be rotated and oriented such that the rotatable keyboard is still accessible for use on the side of the non-dominant hand.

For instance, both sides of the computing device may be positioned flat on a surface with the touch screen side on the left-hand side and the rotatable keyboard side on the right-hand side. That is, the touch screen side and the rotatable keyboard side are positioned side-by-side laying flat on a surface by pivoting the touch screen side and the rotatable keyboard side about the hinge mechanism to lay flat on a horizontal surface. The rotatable keyboard may be rotated so that the rotatable keyboard is oriented and accessible for use. The computing device may be re-positioned, for example by rotating the computing device 180 degrees from its current position, to position the touch screen side on the right-hand side and the rotatable keyboard side on the left-hand side. The rotatable keyboard may be rotated 180 degrees so that the rotatable keyboard is oriented and accessible for use. These features allow the user to easily move their hands left to right for both keyboard and touchscreen, efficiently with minimal effort, maintaining optimal ergonomic positioning and movement.

Further, the computing device may be re-positioned, for example by rotating the computing device 90 degrees from its current position, to position the rotatable keyboard side in front of the touch screen side so that the rotatable keyboard side is closest to a user. The rotatable keyboard may be rotated 90 degrees so that the rotatable keyboard is oriented and accessible for use. The touch screen side may be raised off of the surface such that the computing device is in a laptop-type configuration with the keyboard side flat on the surface and the touch screen side raised off of the surface at a desired angle. Various configurations and orientations of the computing device and the rotatable keyboard will be illustrated and described below.

The touch screen side enables non-keyboard type entries on the touch screen using a touch implement such as, for example, a stylus or a finger. The touch screen may include adjustable sensitivity to such that unintended touch and/or swipes are ignored. The rotatable keyboard includes a keyboard, a trackpad, a camera, one or more programmable buttons, a trackball, a switch, and/or a dual purpose, combined scroll wheel and switch. The components of the rotatable keyboard may be on a rotatable surface such that the components rotate together.

The rotatable keyboard provides features that enable assistive interaction. For example, the camera may include a fisheye lens for eye tracking that orients with the keyboard. The camera may be an infrared camera to assist with gaze and eye tracking. The one or more programmable buttons may be programmed for assistive features such as, for example, text-to-speech (TTS), speech-to-text (STT), text enlarging, screen focus, screen zoom, and/or an application launcher. The dual purpose scroll wheel and switch may be programmed to function as a scroll wheel to use as a graphic mouse scroll wheel and to function as a switch. In this example, the switch may function as an assistive feature to enable a user to control the computing device through the switch. The switch may work in conjunction with the camera, which assists with gaze and eye tracking for screen focus. For instance, the switch may be used to select an item that the user's eye gaze has focused on.

In this manner, the computing device with the rotatable keyboard provides technical advantages over a traditional computing device. The computing device is configurable to provide a lay flat or sketchbook experience for a user that is more natural for drawing and text selection than the typical laptop and, at the same time, keeps the rotatable keyboard handy and available to use for input. This allows the user to easily move their hands left to right for both keyboard and touchscreen, efficiently with minimal effort, maintaining optimal ergonomic positioning and movement.

Referring to FIG. 1, an example sketch of a computing device 100 is illustrated. The computing device 100 includes a first housing portion 102 and a second housing portion 106. The first housing portion 102 is coupled to the second housing portion 106 by a hinge 110. The first housing portion 102 includes a touch screen 104. The second housing portion 106 includes a rotatable keyboard 108. The first housing portion 102 and the second housing portion 106 may pivot about the hinge 110, including pivoting about the hinge such that the first housing portion 102 and the second housing portion 106 lay substantially flat (or align) on a horizontal surface. The rotatable keyboard 108 may include one or more components including a keyboard 112, a trackpad 114, one or more programmable buttons 116a-116c, a trackball/switch 118, and a camera 120. The rotatable keyboard 108 is referred to as rotatable because the rotatable keyboard 108, including its components (i.e., the keyboard 112, the trackpad 114, the programmable buttons 116a-116c, the trackball/switch 118, and the camera 120, may be rotated 360 degrees within the second housing portion 106. That is, the second housing portion 106 remains fixed in position and the rotatable keyboard 108 may be rotated within the second housing portion 106. The rotatable keyboard 108 may be stopped and locked at any position along the path of rotation. In this manner, a user may rotate and position the rotatable keyboard 108 at any desired point within the second housing portion 106.

Figure 2C:
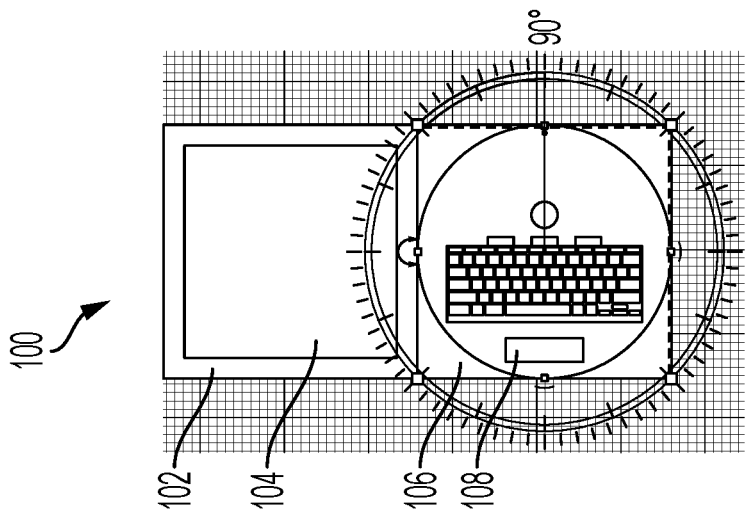
FIGS. 2A-2F illustrate the computing device of FIG. 1 with the rotatable keyboard rotated to various different positions.
Figure 2B:
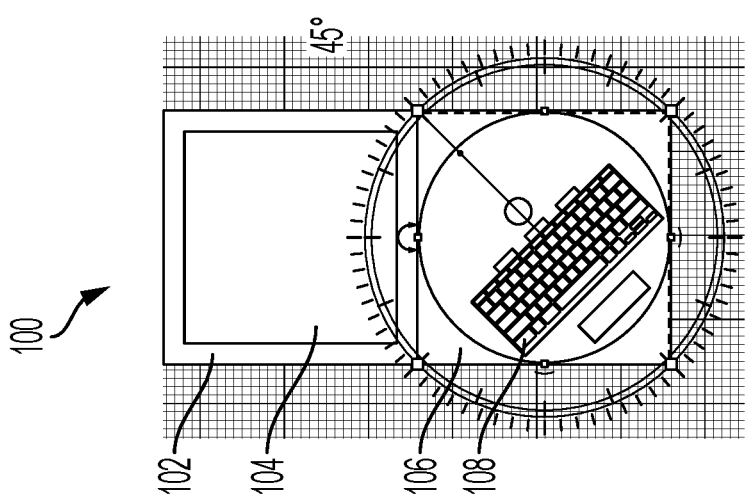
Figure 2A:
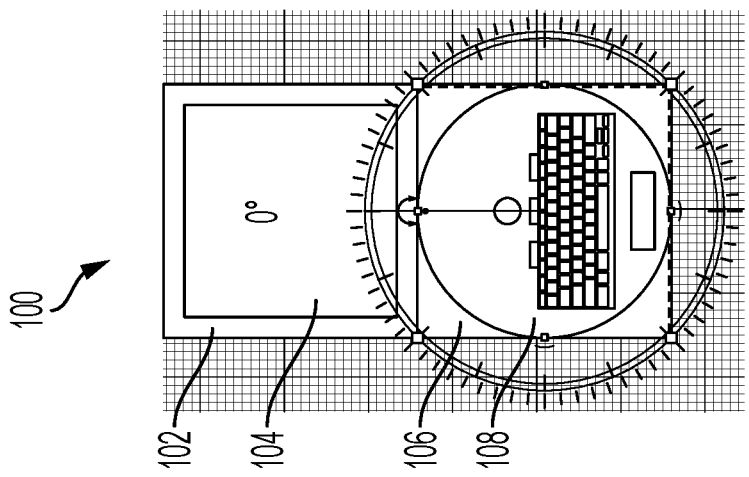

For purposes of illustration, FIGS. 2A-2F illustrates the computing device 100 and the rotatability of the rotatable keyboard 108 by overlaying a compass to show the orientation angle with respect to the second housing portion 106. In these illustrations, the first housing portion 102 and the second housing portion 106 remain in the same relative position and are not moved or re-oriented. FIG. 2A, like FIG. 1, illustrates the computing device 100 with the rotatable keyboard oriented at 0 degrees with respect to the second housing portion 106. A user may manually move and rotate the rotatable keyboard 108 and stop at any point along the illustrated compass. The user may rotate the rotatable keyboard 108 either in a clockwise direction or a counter-clockwise direction. The user may rotate the rotatable keyboard 108 in a complete circle without stopping at a particular point along the illustrated compass. FIGS. 2B-2F illustrate the rotatable keyboard 108 stopped at particular points that are chosen for illustration purposes only. The rotatable keyboard 108 may lock into position when the rotatable keyboard 108 is stopped at a particular point. The rotatable keyboard 108 can then be manipulated and rotated again starting from any position and rotated in either the clockwise or counter-clockwise direction.

FIG. 2B illustrates a clockwise rotation of the rotatable keyboard 108 by 45 degrees within the second housing portion 106. That is, from the starting position of 0 degrees in FIG. 2A, the rotatable keyboard 108 is rotated clockwise 45 degrees to a 45 degree angle. When rotated, the components of the rotatable keyboard 108 illustrated and described in FIG. 1 also rotate together.

Figure 2F:
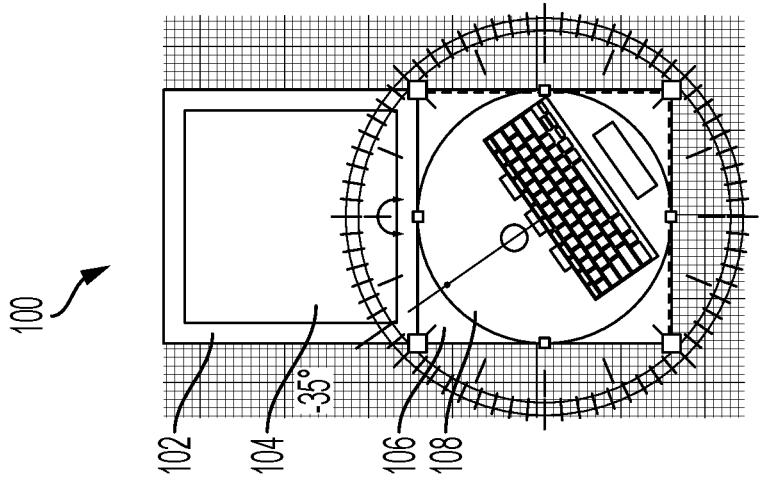
Figure 2E:
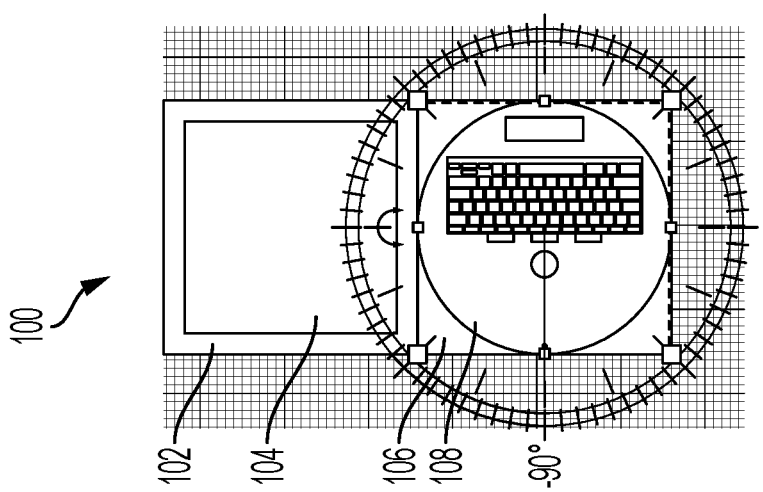
Figure 2D:
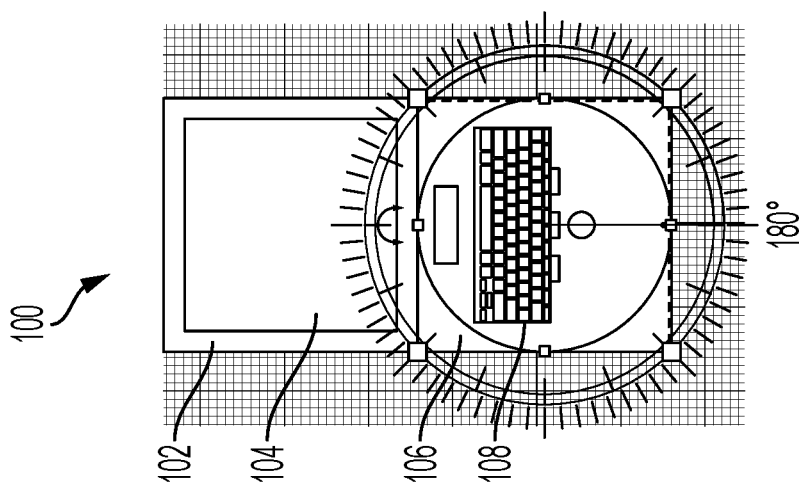

FIG. 2C illustrates a clockwise rotation of the rotatable keyboard 108 by 90 degrees to a 90 degree angle with respect to the second housing portion 106. FIG. 2D illustrates the a rotation, either clockwise or counter-clockwise, of the rotatable keyboard 108 by 180 degrees to a 180 degree angle with respect to the second housing portion 106. FIG. 2E illustrates a counter-clockwise rotation of the rotatable keyboard 108 by 90 degrees to a 90 degree angle with respect to the second housing portion 106. FIG. 2F illustrates the counter-clockwise rotation of the rotatable keyboard 108 by 35 degrees to a 35 degree angle with respect to the second housing portion 106. As noted above, the rotatable keyboard 108 may be rotated in either direction and stopped at any point.

In FIGS. 2A-2F, the rotatable keyboard 108 may be manually rotated by the user. In some implementations, the rotatable keyboard 108 may simply rotate freely in either direction. Friction between the rotatable keyboard 108 and the second housing portion 106 may hold the rotatable keyboard 108 in place at a desired position. In some implementations, for example, the rotatable keyboard 108 may be rotated by applying a slight downward pressure on the rotatable keyboard 108 and moving the rotatable keyboard 108. A release of the downward pressure may hold the rotatable keyboard 108 in place at a desired angle.

Figure 3B:
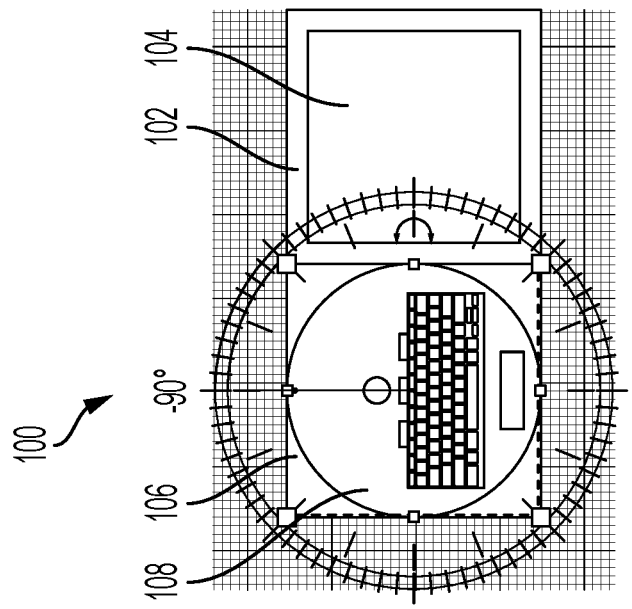
FIGS. 3A-3B illustrate the computing device of FIG. 1 in a side-by-side configuration for a right-hand dominant user.
Figure 3A:
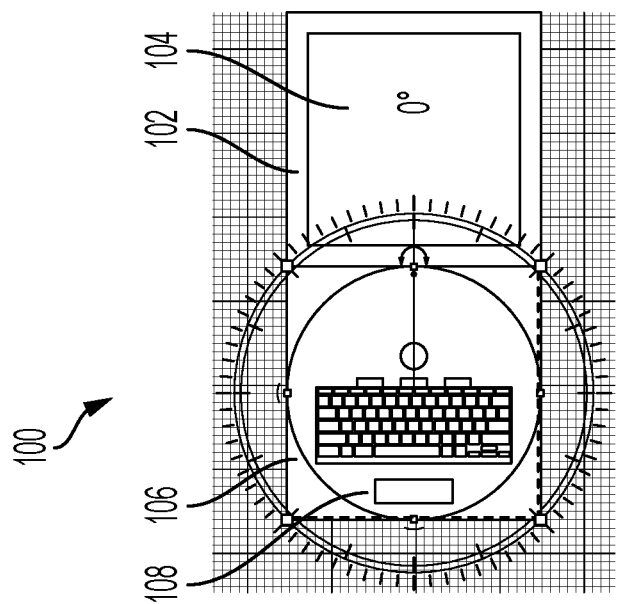

While FIGS. 2A-2F illustrate the computing device 100 with the second housing portion 106 in front of the first housing portion 102 in a back-to-back arrangement, the computing device may be arranged in a side-by-side manner as illustrated in FIGS. 3A-3B and FIGS. 4A-4B. For example, the computing device 100 as illustrated in FIG. 2A may be rotated 90 degrees clockwise so that the first housing portion 102 and the second housing portion 106 are side-by-side as illustrated in FIG. 3A. The first housing portion 102 housing the touch screen 104 may be arranged on the right hand side so that a right-hand dominant user can access the touch screen 104 with the right hand. The user may a touch implement such as a stylus or finger to interact with the touch screen 104. The rotatable keyboard 108 may be rotated counter-clockwise as illustrated in FIG. 3B. In FIG. 3B, the rotatable keyboard 108 is illustrated as being rotated 90 degrees. In this manner, the user, especially a right-handed user, can access both the touch screen 104 and the rotatable keyboard 108 and its components in a side-by-side configuration. While the rotatable keyboard 108 is shown being rotated to a 90 degree angle, the rotatable keyboard 108 may be rotated to any angle that is desired by the user for desired comfort and access by the user.

Figure 4B:
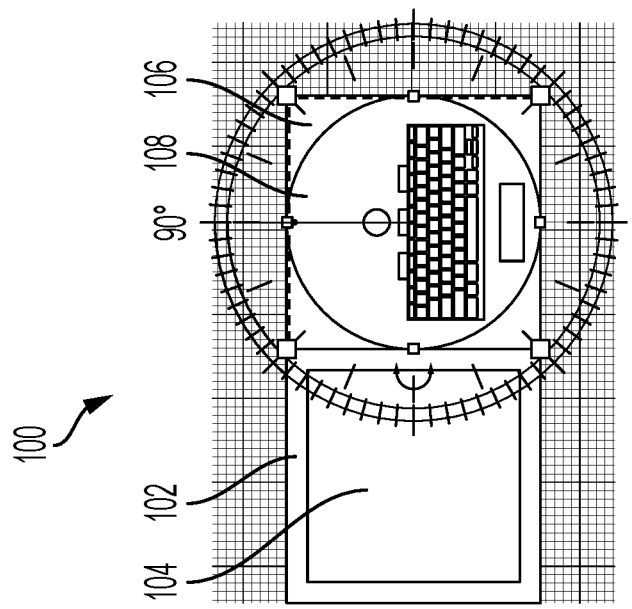
FIGS. 4A-4B illustrate the computing device of FIG. 1 in a side-by-side configuration for a left-hand dominant user.
Figure 4A:
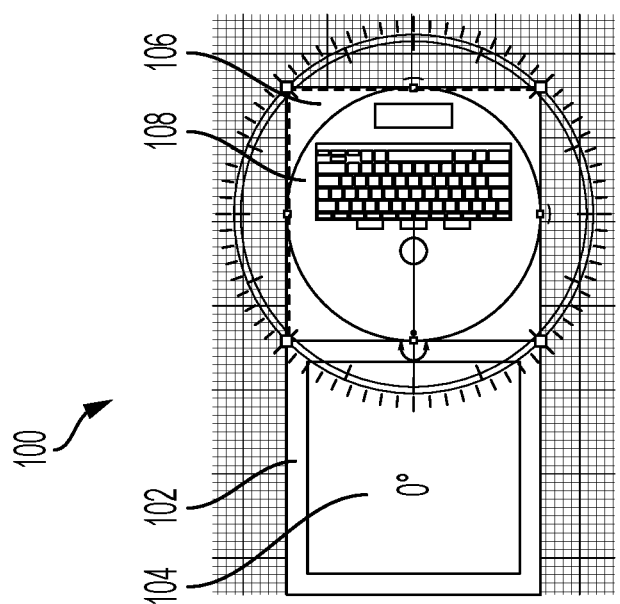

In a manner similar to FIGS. 3A and 3B, FIGS. 4A and 4B illustrate that the computing device 100 may be positioned in a side-by-side configuration for a left-hand dominant user to access and interact with the touch screen 104. For example, the computing device 100 as illustrated in FIG. 2A may be rotated 90 degrees clockwise so that the first housing portion 102 and the second housing portion 106 are side-by-side as illustrated in FIG. 4A. The first housing portion 102 housing the touch screen 104 may be arranged on the left hand side so that a left-hand dominant user can access the touch screen 104 with the left hand. The user may use a touch implement such as a stylus or finger to interact with the touch screen 104. The rotatable keyboard 108 may be rotated clockwise as illustrated in FIG. 4B. In FIG. 4B, the rotatable keyboard 108 is illustrated as being rotated 90 degrees. In this manner, the user, especially a left-handed user, can access both the touch screen 104 and the rotatable keyboard 108 and its components in a side-by-side configuration. While the rotatable keyboard 108 is shown being rotated to a 90 degree angle, the rotatable keyboard 108 may be rotated to any angle that is desired by the user for desired comfort and access by the user.

While the computing device 100 in FIGS. 3A-3B and FIGS. 4A-4B is discussed as starting from the back-to-back arrangement of FIG. 2A, it is understood that the computing device 100 may be positioned and rotated from any desired starting position to any other position. The rotatable keyboard 108 enables complete flexibility to position the computing device 100 in any manner that provides desired access to the touch screen 104 and the rotatable keyboard 108 and its components.

In FIG. 1, FIGS. 2A-2F, FIGS. 3A-3B, and FIGS. 4A-4B, the first housing portion 102 and the second housing portion 106 are illustrated in an open configuration with both the first housing portion 102 and the second housing portion 106 aligned on a horizontal surface. That is, the first housing portion 102 and the second housing portion 106 may lay flat on any surface by positioning (or pivoting) the first housing portion 102 and the second housing portion 106 relative to each other around the hinge 110. While the computing device 100 is illustrated as being flat on a surface, the computing device may be angled with the second housing portion 106 aligned on a horizontal surface and the first housing portion raised off of the horizontal surface at any angle like a laptop computing device. The computing device 100 may be positioned on any type of surface such as, for example, a desk, a table, a lap, etc., and at any angle around the hinge 110.

The hinge 110 connects the first housing portion 102 and the second housing portion 106. The hinge 110 enables an angle of rotation between the first housing portion 102 and the second housing portion 106. In some implementations, the hinge 110 enables a rotation between the first housing portion 102 and the second housing portion 106 of approximately between 0 and 360 degrees.

Figure 5B:
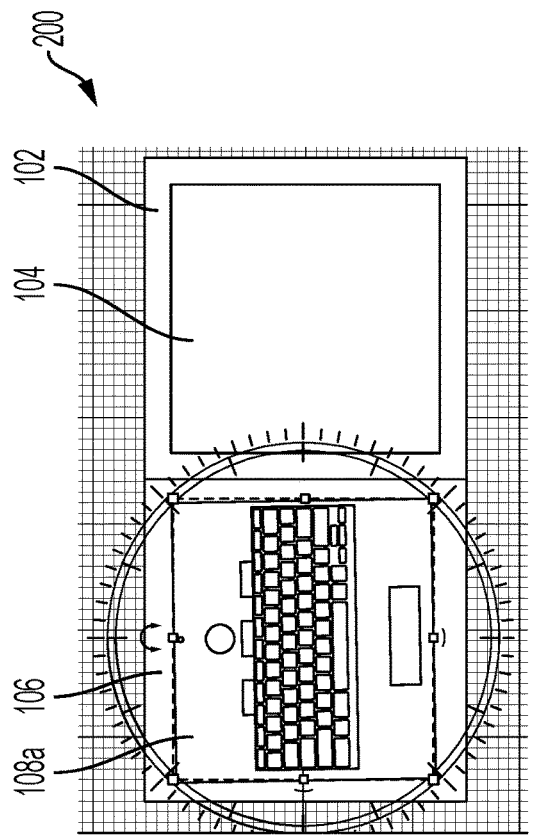
FIGS. 5A-5C illustrate an example sketch of a computing device having a rotatable keyboard.
Figure 5C:
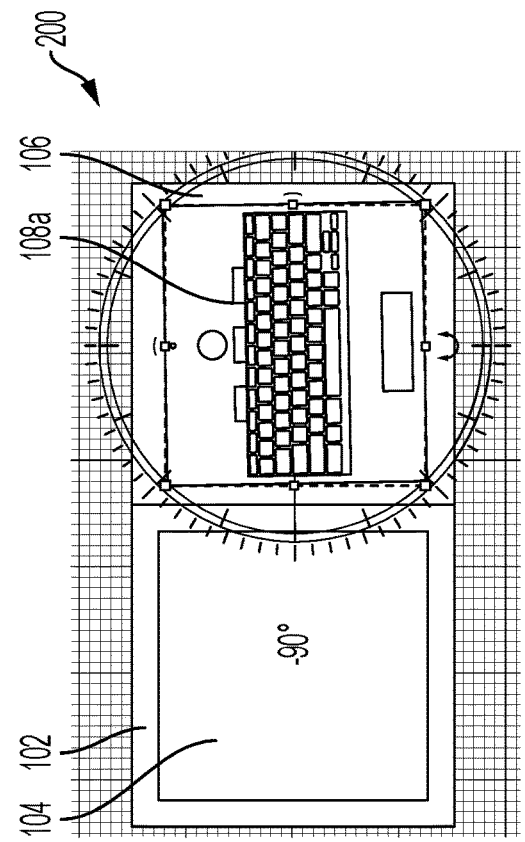
Figure 5A:
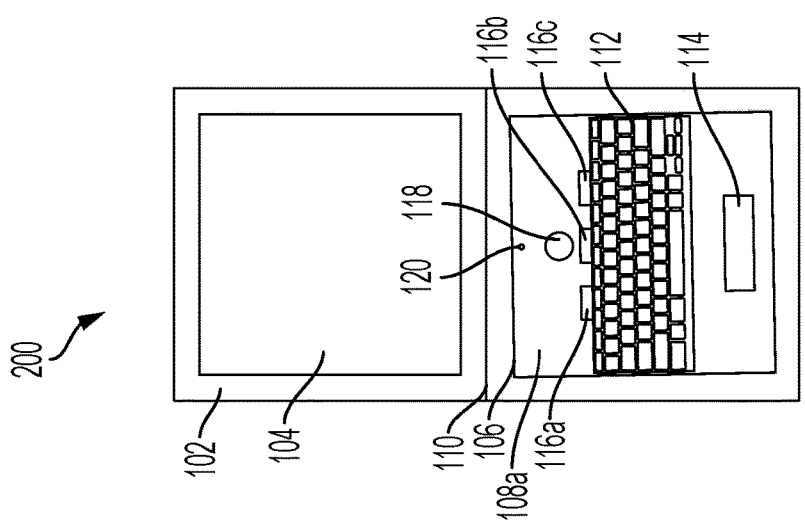

The computing device 100 illustrated in FIG. 1 through FIG. 4B include a rotatable keyboard 108 that is implemented on a round or circular disc or a circular platter. In other implementations, the rotatable keyboard may be implemented on a different shape such as a square disc or square platter such as illustrated in FIGS. 5A-5C. The computing device 200 includes the same or similar components as the computing device 100 of FIG. 1 through FIG. 4B except that the rotatable keyboard 108a is shaped differently than the rotatable keyboard 108. For instance, the computing device 200 includes a first housing portion 102 housing a touch screen 104. The computing device 200 includes a second housing portion 106 housing the rotatable keyboard 108a. A hinge 110 couples the first housing portion 102 and the second housing portion 106. The first housing portion 102 and the second housing portion 106 may be arranged to align on a same horizontal plane. That is, the first housing portion 102 and the second housing portion 106 may lay substantially flat on a surface. Additionally, like the computing device 100 of FIG. 1, the first housing portion 102 and the second housing portion 106 of computing device 200 may be arranged with the second housing portion 106 flat on a surface and the first housing portion 102 raised up off of the surface at any desired angle.

The rotatable keyboard 108a of FIGS. 5A-5C includes the same components as the rotatable keyboard 108 of FIG. 1. Specifically, the rotatable keyboard 108a includes a keyboard 112, a trackpad 114, one or more programmable buttons 116a-116c, a trackball/switch 118, and a camera 120.

Like the arrangement of the computing device 100 in FIGS. 3A-3B for right-hand dominant users, the computing device 200 also may be arranged for right-hand dominant users to have easy access to the touch screen 104 and the rotatable keyboard 108a as illustrated in FIG. 5B allowing the user to easily move their hands left to right for both keyboard and touchscreen, efficiently with minimal effort, maintaining optimal ergonomic positioning and movement. The rotatable keyboard 108a may be manipulated and rotated counter-clockwise 90 degrees (or clockwise 270 degrees) within the second housing portion 106. In this manner, the right-hand dominant user has easy access to the touch screen 104 and the components on the rotatable keyboard 108a in a side-by-side configuration, where the first housing portion 102 is side-by-side with the second housing portion 106 allowing the user to easily move their hands left to right for both keyboard and touchscreen, efficiently with minimal effort, maintaining optimal ergonomic positioning and movement.

Like the arrangement of the computing device 100 in FIGS. 4A-4B for left-hand dominant users, the computing device 200 also may be arranged for left-hand dominant users to have easy access to the touch screen 104 and the rotatable keyboard 108a as illustrated in FIG. 5C allowing the user to easily move their hands left to right for both keyboard and touchscreen, efficiently with minimal effort, maintaining optimal ergonomic positioning and movement. The rotatable keyboard 108a may be manipulated and rotated clockwise 90 degrees (or counter-clockwise 270 degrees) within the second housing portion 106. In this manner, the left-hand dominant user has easy access to the touch screen 104 and the components on the rotatable keyboard 108a in a side-by-side configuration, where the first housing portion 102 is side-by-side with the second housing portion 106 allowing the user to easily move their hands left to right for both keyboard and touchscreen, efficiently with minimal effort, maintaining optimal ergonomic positioning and movement.

In some implementations, the rotatable keyboard 108a may be implemented to stop for use in certain pre-defined (or predetermined) positions so that the points of the square-shaped rotatable keyboard 108a remain within the second housing portion 106 during use and do not overhang the second housing portion 106. In this example, the rotatable keyboard 108a may be configured to stop and lock for use in 90 degree increments. While the rotatable keyboard 108a may rotate in either direction (clockwise or counter-clockwise) and rotate through 360 degrees, it may only stop and be used in 90 degree increments.

Figure 7:
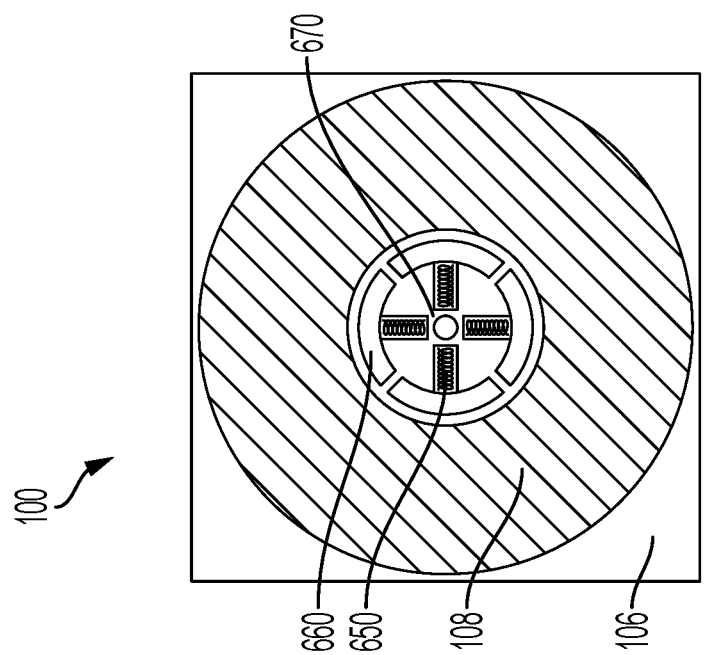
FIG. 7 illustrates an example top view, cross section sketch of the computing device of FIG. 1.
Figure 6:
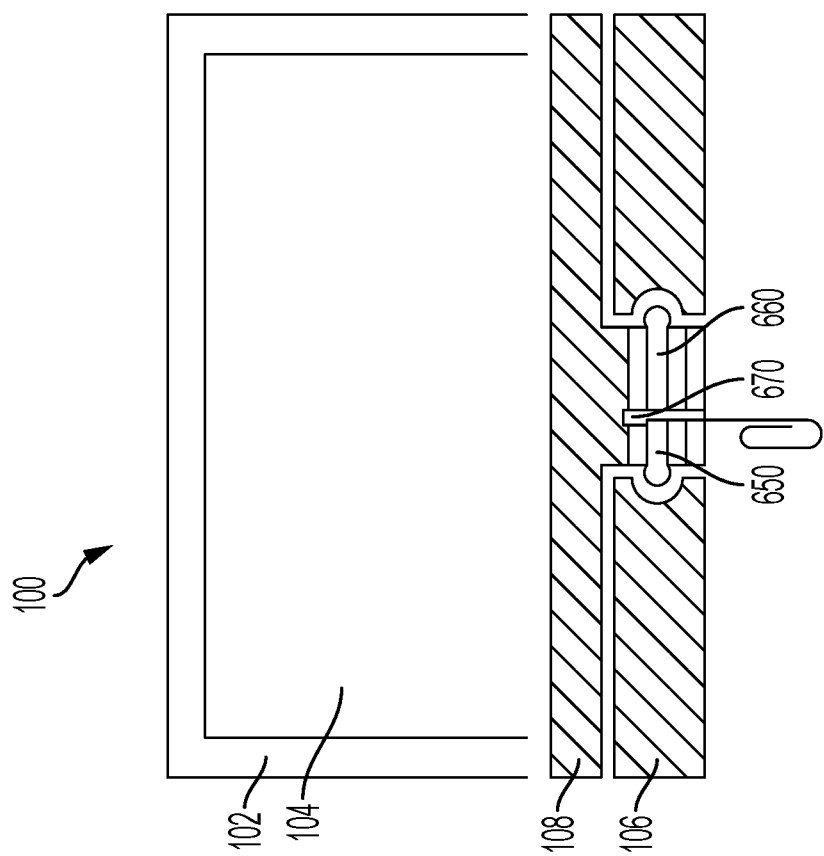
FIG. 6 illustrates an example front view, cross section sketch of the computing device of FIG. 1.

Referring to FIG. 6, the computing device 100 is illustrated with a front view showing the first housing portion 102 and the touch screen 104 raised off of the surface and a front view, cross section of the second housing portion 106 and the rotatable keyboard 108 laying flat on a surface. For simplicity of the illustration, the components on the rotatable keyboard 108 are omitted from this example sketch. Referring also to FIG. 7, a top view, cross section of the rotatable keyboard 108 and the second housing portion 106 is illustrated. In FIGS. 6 and 7, the rotatable keyboard 108 is coupled with a hub mechanism 650. The hub mechanism 650 may be a round or circular-shaped cylinder on which the rotatable keyboard 108 is fixed. The hub mechanism 650 and the rotatable keyboard 108 are configured to rotate within the second housing portion 106. The hub mechanism 650 and the rotatable keyboard 108 may freely rotate by manual manipulation and rotation within the second housing portion 106 and stopped at any desired location. The hub mechanism 650 may be disposed between the rotatable keyboard 108 and the second housing portion 106. In some implementations, the hub mechanism 650 is spring loaded and the hub mechanism 650 and the rotatable keyboard 108 may be moved by applying a force to overcome the spring force to rotate the assembly. Release of the force may lock the rotatable keyboard 108 in a set position.

The hub mechanism 650 may include a conductive slip ring that stays in contact with the second housing portion 106 to provide a path for power and communication with other components of the computing device 100. In some implementations, the hub mechanism may include multiple slip rings that remain in contact with the second housing portion 106 to provide a path for power and communication with other components of the computing device 100. For example, data from the keyboard 112, the trackpad 114, the switch 118, the programmable buttons 116a-116c, and the camera 120 may pass through the conductive connection(s) in the hub mechanism 650 to other components of the computing device 100. In some implementation, the hub mechanism 650 may use wireless communications and a magnetic field to communicate data and power with the other components of the computing device 100 so that the hub mechanism does not have to remain in contact with the second housing portion 106.

The hub mechanism 650 may include separate rings for the components on the rotatable keyboard 108. For example, the hub mechanism 650 may include a camera ring 660 to provide a connection between the camera 120 and the other components of the computing device 100 through the camera ring 660. The other components on the rotatable keyboard 108 also may include a ring on the hub mechanism 650. The hub mechanism 650 may be spring loaded and can be released for repair and cleaning of the hub mechanism 650.

Figure 8:
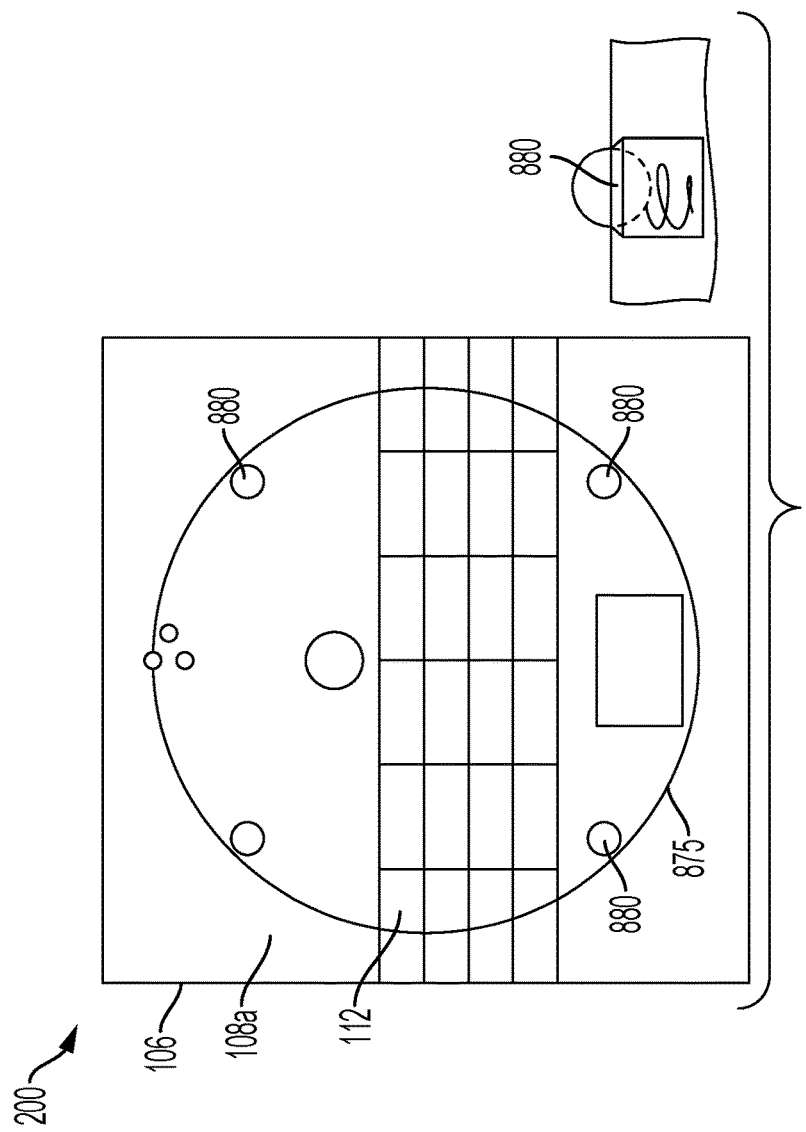
FIG. 8 illustrates an example top view, cross section sketch of the computing device of FIG. 5A.
Figure 9:
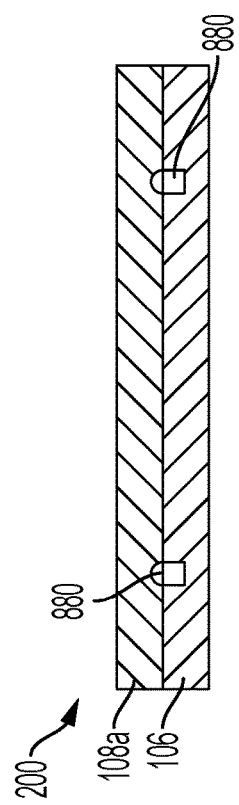
FIG. 9 illustrates an example front view, cross section sketch of the computing device of FIG. 5A.

Referring to FIG. 8, the computing device 200 of FIG. 5A illustrates an example top view, cross section sketch of the rotatable keyboard 108a and the second housing portion 106. Referring also to FIG. 9, an example front view, cross section sketch of the computing device 200 of FIG. 5A showing only the rotatable keyboard 108a and the second housing portion 106. In some implementations, the rotation of the rotatable keyboard 108a may be implemented by using spring loaded bearings 880 with a tracking groove/channel 875. As mentioned above, with the square-shaped rotatable keyboard 108a, the rotatable keyboard 108a may be locked in place at 0 degrees, 90 degrees, 180 degrees, and 270 degrees to prevent damage to the rotatable keyboard 108a or the touch screen 104. The spring loaded bearings 880 with the tracking groove 875 would enable a tight fit during rotation and signal the lock in place for operation of the computing device 200. In some implementations, the touch screen 104 and the components on the rotatable keyboard 108a may be disabled during rotation of the rotatable keyboard 108a until it is locked in one of the pre-determined positions.

One or more of the components on the rotatable keyboard 108 or the rotatable keyboard 108a may provide assistive features. The trackball/switch 118 may be a raised trackball emulator that behaves like a trackball that also leverages any software and programming that may support the trackpad 114. In some implementations, the trackball/switch 118 may behave like a trackball commonly used by graphic designers to perform precision tasks. For motor impaired users, the trackball/switch 118 may be nudged in multiple directions to indicate pre-configured commands based on the direction of movement. The trackball/switch 118 may also function as a switch as described above that works in conjunction with the camera 120 and include eye gaze and tracking software.

The camera 120 may include one or more cameras. The camera 120 may include an infrared camera for gaze and eye tracking. The camera may be used in conjunction with applications that perform gaze and eye tracking as well as head tracking. The camera 120 may support gaze tracking to allow for at least looking/not looking at the screen, and screen quadrants (left, right, bottom, above screen) as a proxy for switch functions. The camera may include sensitivity for eye cursor tracking. In some implementations, the camera 120 may include a fisheye lens.

The one or more programmable buttons 116a-116c may provide interaction shortcuts to enable users one-touch access for certain features. The programmable buttons 116a-116c provide a large target for users with motor impairments and can be sensitive to small motions and used in conjunction with typing sticks.

In some implementations, the programmable buttons 116a-116c may be programmed to launch a speech-to-text (STT) application and a text-to-speech (TTS) application. For users with dyslexia or other coding and decoding challenges, the programmable buttons 116a-116c may be used by the non-dominant hand to initiate common commands while the dominant hand taps and scrolls the page with a finger or stylus on the touch screen 104. With the touch screen 104 and the keyboard 112 side-by-side this enables users to tap where there is a text entry and select the button programmed for STT to take voice from the user and convert it to text at the indicated location. Similarly, highlighted text on the touch screen could be read to the user by selecting the TTS programmed button. Another button could be programmed to magnify the screen area selected by the user.

Figure 10:
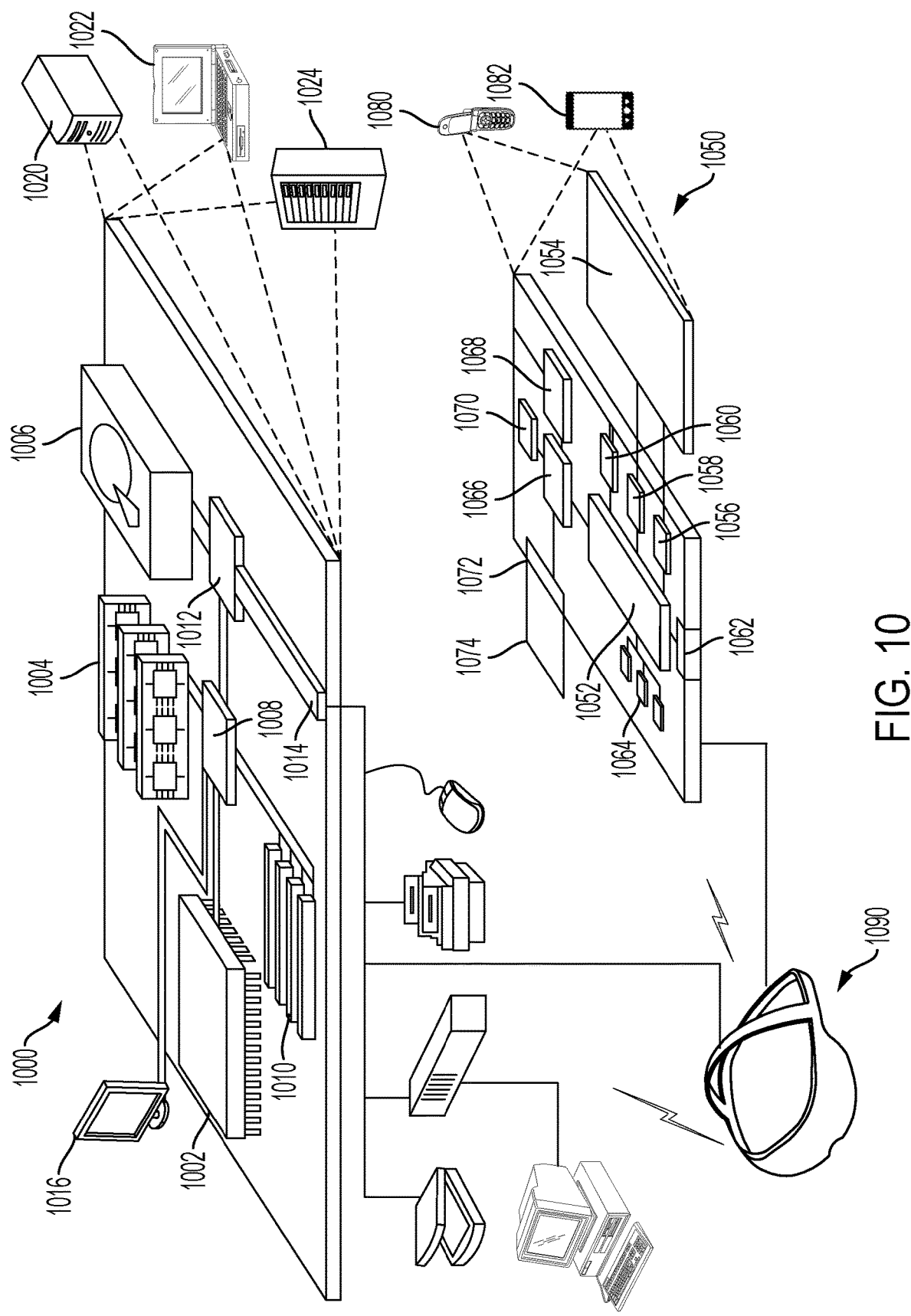
FIG. 10 illustrates an example of a computer device and a mobile computer device that can be used to implement the techniques described herein.

FIG. 10 shows an example of a computer device 1000 and a mobile computer device 1050, which may be used with the techniques described here. For example, computing device 1000 may include the features and components of computing device 100 and computing device 200 described above. Similarly, computing device 100 and computing device 200 may also include the components and features of computing device 1000 described below. For example, computing device 1000 includes a processor 1002 (e.g., a hardware processor), memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022, which may include the features and functionality of the computing devices 100 and 200 described above. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. For example, the computing device 100 and the computing device 200 may include such circuitry and computer programs described above to implement the features of those devices described above, including the assistive features such as for example the STT and TTS features of the one or more programmable buttons.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computing device, comprising:
   a hardware processor;
   a memory;
   a first housing portion including a touch screen display; and
   a second housing portion coupled to the first housing portion by a hinge, the second housing portion including a rotatable keyboard and a trackpad, wherein:
      the second housing portion comprises a hub mechanism disposed between the rotatable keyboard and the second housing portion,
      the hub mechanism comprises a conductive slip ring that provides a path for communication between the rotatable keyboard and the hardware processor;
      the rotatable keyboard rotates about the hub mechanism;
      the rotatable keyboard rotates within a plane parallel to the second housing portion;
      the rotatable keyboard rotates within the second housing portion to a first predefined position such that an entirety of the rotatable keyboard is oriented and accessible for use with the touch screen display to the left of the rotatable keyboard; and
      the rotatable keyboard rotates 180 degrees within the second housing portion from the first predefined position to a second predefined position such that the entirety of the rotatable keyboard is oriented and accessible for use with the touch screen display to the right of the rotatable keyboard, wherein:
         the touch screen display and the trackpad present on the rotatable keyboard is disabled while the rotatable keyboard is being rotated among a plurality of predefined positions comprising the first predefined position and the second predefined position.

2. The computing device of claim 1, wherein the rotatable keyboard further comprises a camera.

3. The computing device of claim 1, wherein the rotatable keyboard further comprises at least one programmable button.

4. The computing device of claim 1, wherein the rotatable keyboard further comprises at least three programmable buttons.

5. The computing device of claim 1, wherein the rotatable keyboard further comprises a trackball.

6. The computing device of claim 1, wherein the rotatable keyboard comprises:
   a keyboard;
   a camera;
   one or more programmable buttons; and
   a trackball.

7. The computing device of claim 1, wherein the first housing portion and the second housing portion pivot about the hinge to arrange the computing device such that a bottom surface of the first housing portion and a bottom surface of the second housing portion align on a horizontal plane.

8. The computing device of claim 7, wherein the first housing portion and the second housing portion further pivot about the hinge to arrange the computing device such that the bottom surface of the second housing portion aligns on the horizontal plane and the bottom surface of the first housing portion does not align on the horizontal plane.

9. The computing device of claim 1, wherein the second housing portion comprises a spring loaded bearing disposed between the rotatable keyboard and the second housing portion, wherein the rotatable keyboard rotates about the spring loaded bearing.

10. The computing device of claim 9, wherein the second housing portion includes a locking mechanism to lock the rotatable keyboard in place within the second housing portion at the plurality of predefined positions.

11. The computing device of claim 1, wherein the rotatable keyboard is configured to rotate 360 degrees within the second housing portion and the second housing portion remains fixed in place relative to the rotatable keyboard.

12. A computing device, comprising:
   a hardware processor;
   a memory;
   a first housing portion including a touch screen display; and
   a second housing portion coupled to the first housing portion by a hinge, the second housing portion including a rotatable keyboard and a hub mechanism disposed between the rotatable keyboard and the second housing portion, wherein:

the hub mechanism comprises a conductive slip ring that provides a path for communication between the rotatable keyboard and the hardware processor; and the rotatable keyboard comprises:
- a keyboard,
- a trackpad,
- a camera, and
- one or more programmable buttons, wherein:
- the rotatable keyboard rotates about the hub mechanism;
- the rotatable keyboard rotates within a plane parallel to the second housing portion;
- the rotatable keyboard rotates within the second housing portion to a first predefined position such that an entirety of the keyboard is oriented and accessible for use with the touch screen display to the left of the keyboard;
- the rotatable keyboard rotates 180 degrees within the second housing portion from the first predefined position to a second predefined position such that the entirety of the keyboard is oriented and accessible for use with the touch screen display to the right of the keyboard, wherein:
  - the touch screen display is configured to be disabled while the rotatable keyboard is being rotated among a plurality of predefined positions comprising the first predefined position and the second predefined position; and
- the rotatable keyboard is configured to rotate 360 degrees within the second housing portion and the second housing portion remains fixed in place relative to the rotatable keyboard.

13. The computing device of claim 12, wherein the second housing portion includes a locking mechanism to lock the rotatable keyboard in place within the second housing portion at the plurality of predefined positions.

14. The computing device of claim 12, wherein the first housing portion and the second housing portion pivot about the hinge to arrange the computing device such that a bottom surface of the first housing portion and a bottom surface of the second housing portion align on a horizontal plane.

15. A computing device, comprising:
- a hardware processor;
- a memory;
- a first housing portion including a touch screen display; and
- a second housing portion coupled to the first housing portion by a hinge, the second housing portion including a rotatable keyboard and a trackpad, wherein:
  - the rotatable keyboard is configured to rotate 360 degrees within the second housing portion and the second housing portion remains fixed in place relative to the rotatable keyboard,
  - the first housing portion and the second housing portion pivot about the hinge to arrange the computing device such that a bottom surface of the first housing portion and a bottom surface of the second housing portion align on a horizontal plane,
  - the second housing portion comprises a hub mechanism disposed between the rotatable keyboard and the second housing portion,
  - the hub mechanism comprises a conductive slip ring that provides a path for communication between the rotatable keyboard and the hardware processor,
  - the rotatable keyboard rotates about the hub mechanism,
  - the rotatable keyboard rotates within a plane parallel to the second housing portion,
  - the rotatable keyboard rotates within the second housing portion to a first predefined position such that an entirety of the rotatable keyboard is oriented and accessible for use with the touch screen display to the left of the rotatable keyboard, and
  - the rotatable keyboard rotates 180 degrees within the second housing portion from the first predefined position to a second predefined position such that the entirety of the rotatable keyboard is oriented and accessible for use with the touch screen display to the right of the rotatable keyboard, wherein:
    - the touch screen display and the trackpad are configured to be disabled while the rotatable keyboard is being rotated among a plurality of predefined positions comprising the first predefined position and the second predefined position.

\* \* \* \* \*